UNITED STATES PATENT OFFICE.

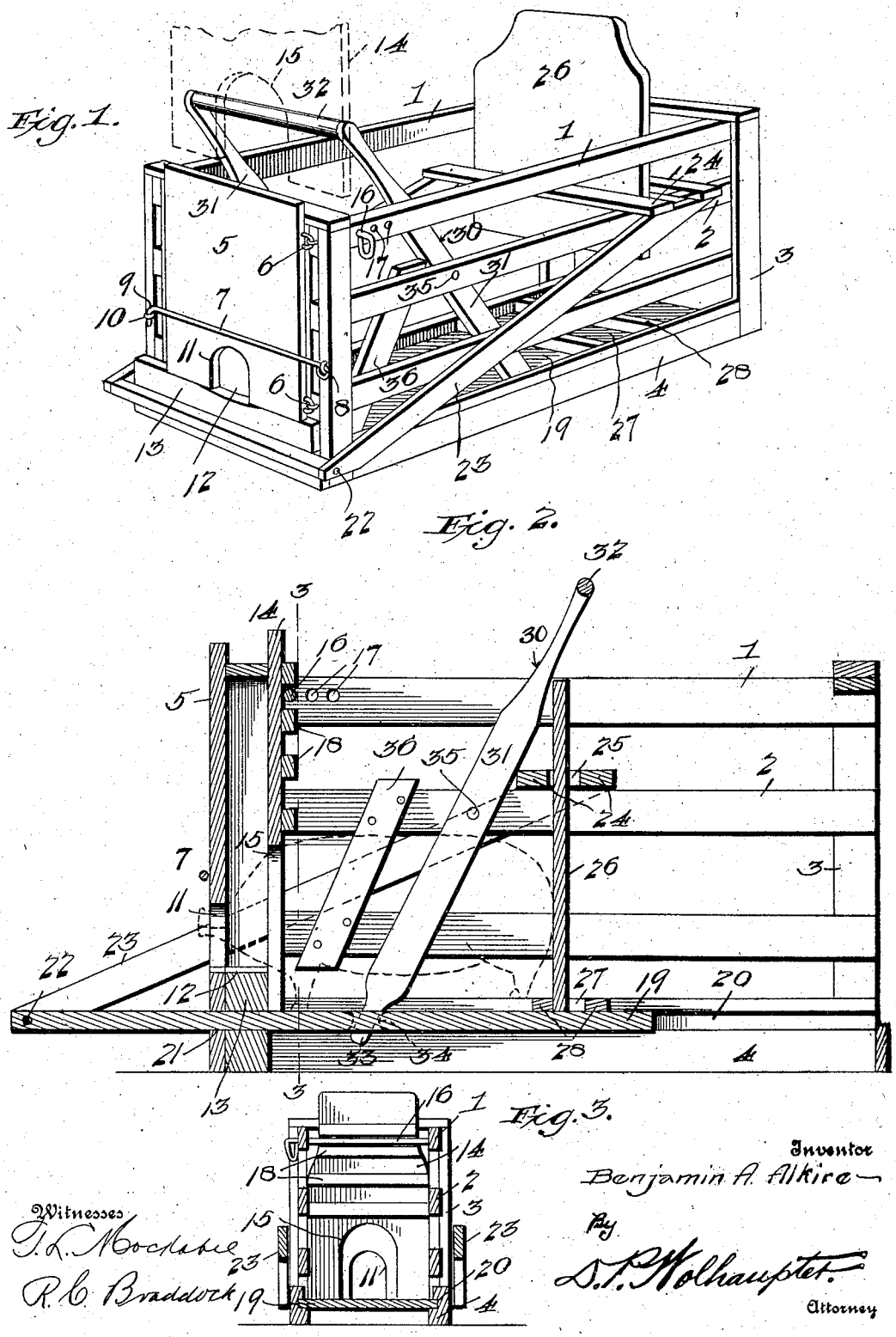

BENJAMIN A. ALKIRE, OF MARYVILLE, MISSOURI.

HOG-TRAP.

No. 839,252.　　　　　Specification of Letters Patent.　　　　　Patented Dec. 25, 1906.

Application filed May 22, 1906. Serial No. 318,219.

*To all whom it may concern:*

Be it known that I, BENJAMIN A. ALKIRE, a citizen of the United States, residing at Maryville, in the county of Nodaway and State of Missouri, have invented certain new and useful Improvements in Hog-Traps, of which the following is a specification.

This invention relates to the care of live stock, and has special reference to that type of apparatus termed "hog-traps," embodying means for catching and holding hogs for ringing and other purposes.

To this end the invention has in view a simple and practical construction of hog-trap comprising a novel construction and arrangement of parts which provide for securely and firmly holding the head and snout of a hog during the ringing operation, while at the same time greatly facilitating the handling of the animal both in positioning the head and snout and in discharging the animal after the operation. In this connection the invention saves considerable time in the handling of the animal and obviates many of the disagreeable features attendant upon forcing the hog into a proper position for being operated upon.

With these and many other objects in view, which will more readily appear as the nature of the invention is better understood, the same consists in the novel construction, combination, and arrangement of parts hereinafter more fully described, illustrated, and claimed.

The essential features of the invention involved in carrying out the objects above indicated are necessarily susceptible to structural change without departing from the scope of the invention, but a preferred embodiment thereof is shown in the accompanying drawings, in which—

Figure 1 is a perspective view of a hog-trap embodying the present invention and showing the parts in proper position for receiving or trapping a hog. Fig. 2 is a longitudinal sectional view of the trap, showing the parts positioned for holding the hog during the operation of ringing. Fig. 3 is a cross-sectional view on the line 3 3 of Fig. 2.

Like references designate corresponding parts in the several figures in the drawings.

In carrying out the present invention the same embodies in its general organization a main trap-body, (designated in its entirety by the numeral 1.) This trap-body is of a sufficient size to accommodate all sizes of the common type of hogs and being of a slatted formation may be properly termed a "slatted stall." This stall is provided with the slatted side portions 2, the corner-posts 3, and the opposite longitudinal bottom side sills 4. Both the front and rear ends of the stall 1 are open to permit the passage of the animal therethrough, and the rear open end is entirely uncovered at all times, while the front open end of the stall is designed to be covered and uncovered through the employment of a front door 5 of suitable strength for barring egress of the animal when captured within the trap. The said front door 5 may be of any suitable design and mounting, but for purposes of illustration the same is shown as being hinged at one edge by means of the hinges 6 to one side of the stall or stall-body, at the front end thereof, and in its closed position covering the front end of the door, and said door is designed to be temporarily secured by means of any suitable fastenings—such, for instance, as a fastening-bar 7, having a hinged connection at one end, as at 8, to one side of the stall-body and provided at its opposite end with a hook 9 for detachable engagement with a keeper 10, fitted to the opposite side of the stall or stall-body.

In addition to its hinged mounting upon the front end portion of the stall-body the front closing-door 5 therefor is provided in its lower edge with a snout-hole 11, designed to overlie a recessed throat-seat 12, formed centrally in the upper surface of the front threshold-sill 13 of the stall-body. The snout of the animal is designed to protrude through the opening provided by the hole 11 and the seat in the sill 13, and its head is designed to be firmly locked down upon the threshold 13 through the employment of a removable yoke-board 14, adapted to be inserted within the front end portion of the stall at the inner side of the opening covered by the door 5. This yoke-board 14 is designed to be of suitable strength for practical purposes and is provided in its lower edge with a neck-opening 15, adapted to fit over the neck of the animal, as plainly shown in Fig. 2 of the drawings. The said yoke-board is also removably held in place through the medium of a stay-rod 16, arranged transversely of the stall-body, behind the upper end portion of the board 14, and designed to adjustably engage in any of a series of rod-receiving holes 17, formed in directly opposite side portions of the stall or stall-body. The said rod 16 is placed in any of the said holes 17, according to the thickness of the board 14 which may be required, according to the strength or size of the animal, and also the said board 14 is provided upon one side thereof with a series of transverse spaced supporting-cleats 18, one of which is adapted to engage beneath the rod 16 to prevent the hog from lifting the yoke-board out of place. Several of the cleats 18 are employed to accommodate the yoke-board to animals of different sizes.

In combination with the parts described the apparatus includes a shiftable floor 19, whose longitudinal side edges slidably engage the longitudinal guideways 20, formed at opposite inner sides of the stall-body, at the bottom thereof. The said shiftable sliding floor 19 is adapted to slide through a front guide-opening 21, provided through or beneath the threshold-sill 13, and the front or extreme front end of the said floor is designed to have pivotally or otherwise suitably connected thereto, as at 22, the front end portion of an inclined gate-carrier frame 23. This gate-carrier frame essentially comprises opposite side bars arranged upon the outside of the stall-body and connected at their inner upper ends by a pair of cross-bars 24, spaced apart to leave the opening 25, forming an upper holding-keeper for the removable tail-gate 26, the lower end of which gate is adapted to rest on the lower holding-seat 27, provided on the floor 19, between the cleats 28 thereon.

To provide for operating the floor, there is employed an operating-lever 30, consisting of a lever-frame having opposite side bars 31, connected at their upper ends by a cross-handle 32 and whose lower ends are contracted to form engaging pins 33, loosely and pivotally engaging the pivot-holes 34, formed directly in the floor 19. The side bars 31 of the lever are pivoted intermediate their ends, as at 35, to the inner sides of the stall-body, and fixed side cleats 36 are preferably arranged upon the inner sides of the slatted body in advance of the lever side bars to limit the forward throw thereof.

The trap may be conveniently employed at the opening of a gate or any other convenient position where a hog may be readily trapped, and to accomplish this result the parts are positioned as shown in Fig. 1 of the drawings—that is, with the front bar 5 closed, the yoke-board 14 and the tail-gate 36 both elevated. The hog is driven into the trap and the tail-gate 26 dropped, thus trapping the animal. Then by swinging the lever 31 sufficiently and at the same time pressing the yoke-board 14 down upon the neck of the animal the snout is forced into the position desired through the snout-hole 11 in the front door. Then the animal is securely held for ringing or other purposes, and after the operation is completed the front door is unfastened, the yoke-board 14 lifted, and the animal is free to move out of the stall, which movement may be accelerated, if necessary, by sliding the shiftable floor farther forward to such extent as may be permitted by the play left for the lever 30 after positioning the animal.

From the foregoing it is thought that the construction, use, and advantages of the herein-described hog-trap will be apparent without further description; but at this point it should be further observed that the fixed side cleats 36 are particularly designed as guiding members for guiding the yoke-board 14 into position. In this connection it will be observed that the said guiding and stop cleats 36 enable the operator to start the yoke-board or gate 14 behind the head of the hog in an inclined position as the animal is moved toward the front door, and in straightening the board or gate 14 to a position where it may be held by the fastening 16 the said board or gate acts as a lever on the head of the animal, so that the latter will be compelled to thrust his snout through the hole in the front door.

I claim—

1. A hog-trap comprising a stall provided at its front end with head-holding means, and with a rear open end, a lever-operated shiftable stall-floor, and a removable tail-gate supported on and carried with said floor.

2. A hog-trap comprising a stall open at both ends, a snout-holding front door arranged to cover and uncover the front end of the stall, a neck-holding yoke-board arranged within the stall-body at the inner side of its front opening, a shiftable floor, and a tail-gate supported on and carried with said floor.

3. A hog-trap comprising a stall open at both ends, a snout-holding front door arranged to cover and uncover the front opening of the stall, a vertically-adjustable neck-holding yoke-board removably held within the front end of the stall at the inner side of its front opening, a sliding stall-floor mounted within the stall-body, a gate-carrier frame carried by said floor, a tail-board held upon the floor by said frame, and a swinging lever mounted upon the stall-body and pivotally connected with said floor.

4. A hog-trap comprising a stall open at both ends and provided with a front threshold-sill, a front door hinged to the front end of the stall and having a snout-hole overlying said threshold-sill, a vertically-adjustable yoke-board detachably fastened within the front end of the stall and provided in its lower edge with a neck-engaging opening, a shiftable floor slidably mounted within the bottom portion of the stall, a gate-carrier frame carried by said floor and having a holding-keeper disposed above the floor, a removable tail-gate arranged in said keeper and engaging the floor, and a swinging lever-frame mounted on the stall and operatively connected with said floor.

In testimony whereof I hereunto affix my signature in the presence of two witnesses.

BENJAMIN A. ALKIRE.

Witnesses:
   GEO. E. FLEMMING,
   W. C. FRANK.